United States Patent
Miller et al.

(10) Patent No.: US 7,362,336 B2
(45) Date of Patent: Apr. 22, 2008

(54) FOUR COLOR DIGITAL CINEMA SYSTEM WITH EXTENDED COLOR GAMUT AND COPY PROTECTION

(75) Inventors: Michael E. Miller, Honeoye Falls, NY (US); Michael J. Murdoch, Rochester, NY (US); Thomas E. Madden, Fairport, NY (US)

(73) Assignee: Eastman Kodak Company, Rochester, NY (US)

(*) Notice: Subject to any disclaimer, the term of this patent is extended or adjusted under 35 U.S.C. 154(b) by 470 days.

(21) Appl. No.: 11/033,782

(22) Filed: Jan. 12, 2005

(65) Prior Publication Data

US 2006/0152524 A1   Jul. 13, 2006

(51) Int. Cl.
| | |
|---|---|
| G06T 15/50 | (2006.01) |
| G09G 5/02 | (2006.01) |
| G06K 9/00 | (2006.01) |
| G06K 9/34 | (2006.01) |
| H04N 9/12 | (2006.01) |
| H04N 1/387 | (2006.01) |
| H04N 1/40 | (2006.01) |
| H04N 1/167 | (2006.01) |
| G09G 5/10 | (2006.01) |
| G09G 3/34 | (2006.01) |

(52) U.S. Cl. .................... 345/589; 345/426; 345/593; 345/692; 345/84; 348/742; 358/453; 358/462; 380/200; 380/201; 382/162; 382/164; 382/282; 382/165

(58) Field of Classification Search ........... 345/426, 345/589–593, 581, 597–601, 549, 555, 204, 345/690–694, 213–214, 22, 84; 348/799–803, 348/742–743; 358/509–510, 452–453, 462; 380/200–201; 382/162–167, 282–284, 176, 382/274

See application file for complete search history.

(56) References Cited

U.S. PATENT DOCUMENTS

| | | | |
|---|---|---|---|
| 4,644,422 A | 2/1987 | Bedini | 360/60 |
| 5,233,385 A | 8/1993 | Sampsell | 355/35 |
| 5,530,759 A | 6/1996 | Braudaway et al. | 380/54 |
| 5,809,139 A | 9/1998 | Girod et al. | 380/5 |
| 5,875,249 A | 2/1999 | Mintzer et al. | 380/54 |
| 5,912,972 A | 6/1999 | Barton | 380/23 |

(Continued)

FOREIGN PATENT DOCUMENTS

EP   1414250   4/2004

(Continued)

OTHER PUBLICATIONS

U.S. Appl. No. 09/685,832, filed Oct. 9, 2000, BabakTerhranchi et al.

(Continued)

*Primary Examiner*—Wesner Sajous
(74) *Attorney, Agent, or Firm*—Peyton C. Watkins; Stephen H. Shaw

(57) ABSTRACT

A color display system including a display device for four or more visible color primaries and a processor for controlling the four or more color primaries to selectively render portions of an image or image sequence such that visually equivalent colors displayed in two or more image portions differ in their spectral composition.

33 Claims, 8 Drawing Sheets

U.S. PATENT DOCUMENTS

| | | | |
|---|---|---|---|
| 5,960,081 A | 9/1999 | Vynne et al. | 380/10 |
| 6,018,374 A | 1/2000 | Wrobleski | 348/744 |
| 6,031,914 A | 2/2000 | Tewfik et al. | 380/54 |
| 6,037,984 A | 3/2000 | Isnardi et al. | 348/403 |
| 6,044,156 A | 3/2000 | Honsinger et al. | 380/54 |
| 6,069,914 A | 5/2000 | Cox | 375/150 |
| 6,570,584 B1 | 5/2003 | Cok et al. | 345/690 |
| 6,648,475 B1 | 11/2003 | Roddy et al. | 353/31 |
| 2002/0191130 A1 | 12/2002 | Liang et al. | 349/108 |
| 2003/0128225 A1* | 7/2003 | Credelle et al. | 345/694 |
| 2003/0197855 A1* | 10/2003 | Jung et al. | 356/73 |
| 2004/0051724 A1 | 3/2004 | Elliott et al. | 345/694 |
| 2004/0246345 A1* | 12/2004 | Ohsawa et al. | 348/222.1 |
| 2005/0008346 A1 | 1/2005 | Noguchi et al. | 386/125 |
| 2005/0041804 A1* | 2/2005 | Mese et al. | 380/54 |
| 2005/0185014 A1* | 8/2005 | Raman | 347/19 |
| 2006/0082844 A1* | 4/2006 | White | 358/504 |
| 2006/0238832 A1* | 10/2006 | Ohsawa | 358/518 |
| 2006/0250607 A1* | 11/2006 | Takahashi | 356/124 |
| 2007/0029951 A1* | 2/2007 | Lamesch | 315/360 |
| 2007/0094656 A1* | 4/2007 | Talati et al. | 717/168 |
| 2007/0146509 A1* | 6/2007 | Hekstra et al. | 348/253 |

FOREIGN PATENT DOCUMENTS

WO   WO 01/95544 A2   12/2001

OTHER PUBLICATIONS

U.S. Appl. No. 10/607,374, filed Jun. 26, 2003, Michael J. Murdoch et al.

U.S. Appl. No. 10/812,787, filed Mar. 29, 2003, Michael E. Miller et al.

"A Spatial Extension of CIELAB for Digital Color Image Reproduction" by Xuemei Zhang and Brian A. Wandell.

* cited by examiner

FOUR COLOR DIGITAL CINEMA SYSTEM WITH EXTENDED COLOR GAMUT AND COPY PROTECTION

FIELD OF THE INVENTION

This invention generally relates to a display apparatus for embedding information in an image and more particularly relates to a method for marking and distorting a displayed image (e.g., a displayed motion picture image) in order to discourage recording the image with a video camera.

BACKGROUND OF THE INVENTION

Movie piracy is a cause of substantial revenue loss to the motion picture industry. Illegally copied movies, filmed during projection with video cameras or camcorders and similar devices, are a significant contributing factor to revenue loss. Even the questionable quality of movies pirated in this fashion does not prevent them from broad distribution in the "black market", especially in some overseas markets, and on the Internet. As video cameras improve in imaging quality and become smaller and more capable, the threat of illegal copying activity becomes more menacing to motion picture providers. While it may not be possible to completely eliminate theft by copying, it can be advantageous to provide display delivery techniques that frustrate anyone who attempts to copy a motion picture using a portable video camera device. While this is a highly visible problem in the motion picture industry, this same problem is likely to be manifested in other industries that use digital media.

Skilled practitioners know how to provide a distinct symbol or watermark to an original still image as a means of image or copy identification, such as in order to authenticate a copy. U.S. Pat. No. 5,875,249 (Mintzer et al.), U.S. Pat. No. 6,031,914 (Tewfik et al.), and U.S. Pat. No. 5,912,972 (Barton) disclose methods of applying a perceptually invisible watermark to image data as verification of authorship or as evidence that an image has not been altered. Although, such methods identify and validate image data, they provide no direct means of protection against copying an image, for example, with a conventional scanner and color printer. In contrast, U.S. Pat. No. 5,530,759 (Braudaway et al.) discloses providing a visible, color correct watermark that is generated by altering brightness characteristics, but not chromaticity of specific pixels in the image. Yet the approach used in U.S. Pat. No. 5,530,759 could be objectionable, if used for a motion picture, since the persistence of an image or a mark overlaid on the moving image could annoy an audience and adversely affect the viewing experience.

The above examples for still images illustrate a key problem: an invisible watermark identifies but does not adversely affect the quality of an illegal copy, while a visible watermark can be distracting and annoying. With video and motion picture images, that include multiple images, there can be yet other problems with conventional image watermarking. For example, U.S. Pat. No. 5,960,081 (Vynne et al.) discloses applying a hidden watermark to MPEG data using motion vector data; but this method identifies and authenticates the original compressed data stream and would not provide identification for a motion picture that was copied using a camcorder. Other patents, such as U.S. Pat. No. 5,809,139 (Girod et al.), U.S. Pat. No. 6,069,914 (Cox), and U.S. Pat. No. 6,037,984 (Isnardi et al.) discuss adding an imperceptible watermark directly to the discrete cosine transform (DCT) coefficients of an MPEG-compressed video signal. These methods, however, provide a watermark that is primarily detectable in the compressed image data itself. When watermarked images are subsequently recompressed, using a lossy compression method, (with a camcorder, for example) or are modified by some other image processing operation, the watermark may no longer be detectable.

The watermarking schemes disclosed in the patents listed above add a watermark to the compressed bit stream of an image or image sequence. Alternatively, there are other watermarking schemes that add the watermark to the image data itself, rather than to the compressed data representation. An example of such a scheme is given in U.S. Pat. No. 6,044,156 (Honsinger et al.), which discloses a spread spectrum technique using a random phase carrier. However, regardless of the specific method that is used to embed a watermark, there is always a desire that a watermarking method be robust; that is, able to withstand various "attacks" meant to remove or alter the watermark. Some attacks may be deliberately aimed at the underlying structure of a given watermarking scheme and require detailed knowledge of watermarking techniques applied. However, most attack methods are less sophisticated, performing common modifications to the image such as using lossy compression, introducing low-pass filtering, or cropping the image, for example. Such modifications can be made when a video camera is used to capture a displayed motion picture. These methods present a constant threat that a watermark may be removed during the recording process.

The watermarking schemes noted above are directed to copy identification, ownership, or authentication. However, even if a watermarking approach is robust, provides copy control management, and succeeds in identifying the source of a motion picture, an invisible watermark may not be a sufficient deterrent for illegal copying.

As an alternative to watermarking, some copy deterrent schemes used in technologies other than video or movie display operate by modifying a signal or inserting a different signal to degrade the quality of illegal copies. The modified or inserted signal does not affect playback of a legally obtained manufactured copy, but adversely impacts the quality of an illegally produced copy. As an example of this principle, U.S. Pat. No. 4,644,422 (Bedini) discloses adding a degrading signal to discourage copying of audio recordings. An audio signal having a frequency at and above the high threshold frequency range for human hearing is selectively inserted into a recording. The inserted signal is not detectable to the listener. However, any unauthorized attempt to copy the recording onto tape obtains a degraded copy, since the inserted audio signal interacts adversely with the bias oscillator frequency of a tape recording head.

As a variation of the general method where a signal is inserted that does not impact viewability, but degrades copy quality, U.S. Pat. No. 6,018,374 (Wrobleski) discloses the use of a second projector in video and motion picture presentation. This second projector is used to project an infrared (IR) message onto the display screen, where the infrared message can contain, for example, a date/time stamp, theater identifying text, or other information. The infrared message is not visible to the human eye. However, because a video camera has broader spectral sensitivity that includes the IR range, the message will be clearly visible in any video camera copy made from the display screen. The same technique can be used to distort a recorded image with an "overlaid" infrared image. While the method disclosed in U.S. Pat. No. 6,018,374 can be effective for frustrating casual camcorder recording, the method has some drawbacks; including the fact that the pattern is fixed in space and, therefore, it is a relatively simple procedure to edit it from the digital data.

A more sophisticated video camera operator could minimize the effect of a projected infrared watermark by placing a filter designed to block infrared light in the video camera's optical path. A further drawback of the method is that a fourth image channel, an additional projector, or modifications to the projection screen is required to implement this method, and this additional hardware can add significant cost to a display or projection system without providing any benefit beyond defeating movie piracy.

While display systems typically provide for three color channels for the display of visible light, it is also known in the art to provide display systems which project four or more channels of visible light to enhance the viewing experience. These display systems can provide additional color primaries to expand the color gamut of the display system as described by U.S. Pat. No. 6,570,584 (Cok et al.) or to increase the brightness of the display system as described by U.S. Pat. No. 5,233,385 (Sampsell).

There remains a need for a method and a display system that allows watermarking and copy-deterrent marking of image content (e.g., motion picture content), that utilizes visible light, and yet allows the watermark information to be displayed such that it is invisible to the viewer, yet quite apparent in an illegal video copy.

SUMMARY OF THE INVENTION

The aforementioned need is met according to the present invention by providing a color display system, comprising:

(a) a display device having four or more visible color primaries capable of producing metamerically matched color stimuli; and (b) a processor for controlling the four or more color primaries to selectively render portions of an image or image sequence such that visually equivalent colors displayed in two or more image portions differ in their spectral composition.

Another aspect of the invention provides a method for a method for using visible light to deter unwanted copying of image content, comprising the steps of;

(a) combining four or more visible color primaries to render different portions of an image or image sequence such that a given input image color displayed in two or more portions has a different spectral composition and is perceived as visually equivalent; and (b) displaying the portions as part of the image content.

Still another aspect of the invention provides a method for a method for hiding and revealing text or image data using a display device, comprising the steps of:

(a) combining four or more visible color primaries to render portions of an image or image sequence such that visually equivalent colors displayed in two or more image portions differ in their spectral composition; and (b) providing a means for visually differentiating the portions.

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

In the description and claims that follow, the term "invisible" or "substantially invisible" uses the conventional meaning, that is, not perceptible to the unaided human eye. In the context of the present invention, it will be understood that visual content that is intended to be invisible may be near or slightly above detectability limits for some observers. Similarly, the term "visually equivalent" describes multiple stimuli that appear the same to a normal human observer. In the context of the present invention, it will be understood that content that is intended to be visually equivalent may be near or slightly above detectability limits for some observers. Further, the term "metamerically matched" refers to color stimuli that are visually equivalent, as defined above, therefore the color difference between metamerically matched stimuli may be near or slightly above detectability limits for some observers.

It is understood that the neural signals that enable human vision originate in the human retina. It is further understood that the sensors that are present in the human retina and that result in photopic (i.e., daylight) vision are of one of three types with one of three spectral sensitivities. As a result, the three retinal responses resulting from any visible color stimulus that is viewed under photopic conditions can also be synthesized from a combination of three color primaries whose chromaticities enclose those of the color stimulus when the color stimulus and the primaries are plotted in the 1931 CIE chromaticity diagram. The human visual system also includes a fourth type of sensor with a fourth spectral sensitivity. However, this sensor is active only under low-light conditions.

Figure 1:
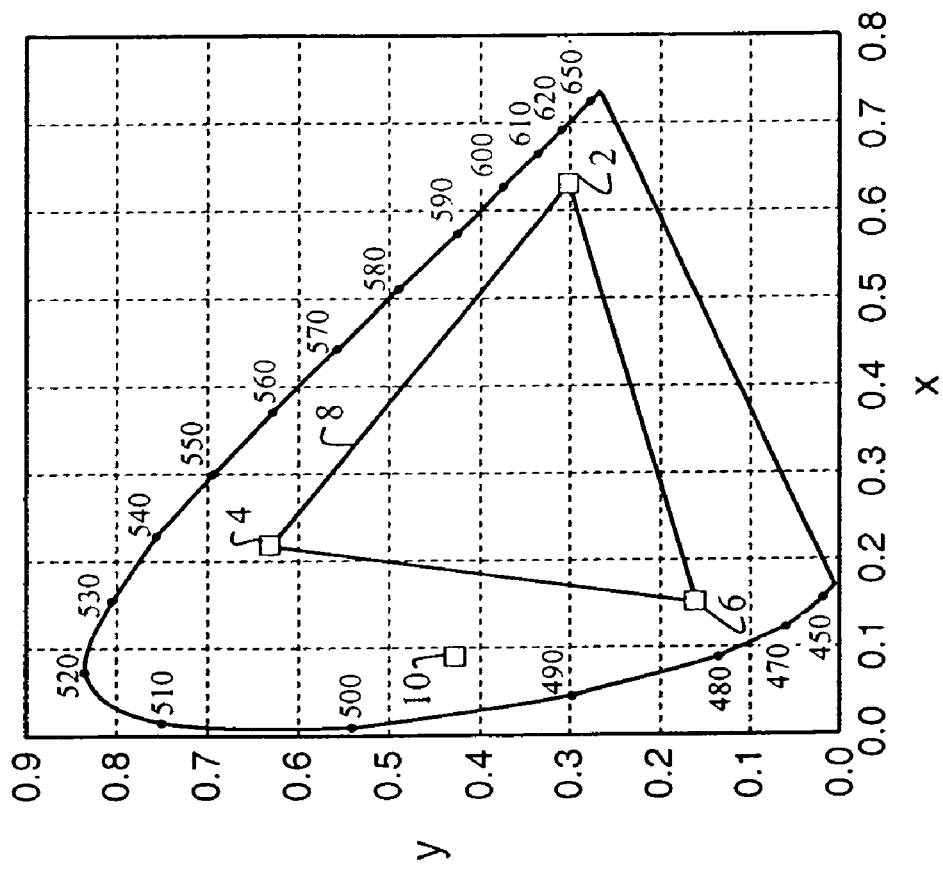
FIG. 1 is a CIE chromaticity prior art diagram showing coordinates for red, green, blue and cyan color primaries.

For the present invention, the fact that the human visual system has three active sensors under normal photopic viewing conditions means that a combination of any three distinct color primaries may be used to form any color stimulus whose chromaticities are within the triangle formed by the color primaries' chromaticity coordinates when plotted in the 1931 CIE chromaticity prior art diagram as shown in FIG. 1. FIG. 1 shows the chromaticity coordinates of a set of red 2, green 4, and blue 6 color display primaries. While these three color primaries are representative of those used within traditional display devices, any three color primaries within the 1931 CIE chromaticity diagram spectrum locus may be applied within this invention. A color gamut boundary 8 may be drawn within the 1931 CIE chromaticity space by connecting the chromaticities of the three color primaries, thus forming a triangle.

A color whose chromaticities are contained within the color gamut boundary 8 may be formed using a linear combination of the red 2, green 4, and blue 6 primaries. A fourth color primary having a fourth chromaticity coordinate 10 also may be incorporated in the display device. In this example, the color of the fourth color primary may be described generally as cyan, however, any other additional color primary also may be applied within this invention. Examining FIG. 1 further, one can see that once this fourth color primary's chromaticity coordinates are added to the 1931 CIE chromaticity diagram, two additional triangles may be drawn that overlap the initial triangle 8. These include a triangle that connects the red 2, green 4, and the fourth color primary 10 chromaticity coordinates as well as the triangle that connects the blue 6, red 2, and the fourth color primary 10 chromaticity coordinates. Note that any color whose chromaticities fall within the color gamut boundary 8 may now be formed using either a linear combination of the original red 2, green 4, and blue 6 primaries or by a linear combination of two of the red 2, green 4, and blue 6 primaries in combination with the fourth color primary 10. Further, any color whose chromaticities are within the color gamut boundary 8 can be formed from any linear combination of these two solutions using all four color primaries. Therefore, a given color may be formed using any of a large number of color-primary combinations.

One should note that the spectral composition of the light generated by any of these equivalent solutions will differ. Furthermore, while the human eye will perceive any of the linear combination solutions using the four primaries to be visually equivalent, the spectra produced by these different solutions will each be captured differently by an image-capture device, such as a digital camera or camcorder. It is very difficult, if not practically impossible, to design an image capture device that has spectral sensitivities corresponding to those of the human eye or any linear combination thereof. Instead, image-capture devices generally are designed to have spectral sensitivities that coincide generally with the long (red), medium (green), and short (blue) wavelength regions of the visible spectrum, with the result that these devices will often detect colors differently than they are detected by the human visual system. This fact is demonstrated within the example calculations that are provided within this disclosure.

The principle of the present invention is the selective rendering of different portions of an image or image sequence using a display device having four or more color primaries. Herein, rendering is defined as the process of producing a light output having a desired color spectrum or that is defined in a known coordinate color space. The display device may render a specific spatial portion of an image or temporal portion of an image sequence using one linear combination of the four or more primaries and render one or more other portions of said image or image sequence using one or more additional linear combinations of the four primaries. The linear combinations of primaries produce light output with substantially consistent chromaticity coordinates and luminance, but that differ in their spectral composition. The portions may be selected to form an image or text watermark. The watermark, for example, may provide information about the copyright of the image content, the owner or location of the display device or any other relevant information. Since the unaided human eye will perceive color stimuli produced in different image portions by different combinations of the at least four color primaries as being visually equivalent, the different portions will appear homogenous to the unaided eye of the observer. However, when such an image is recorded using an image-capture device, color stimuli produced in the different spatial regions by different combinations of the at least four color primaries will be recorded inconsistently and/or non-uniformly, making the spatial regions, i.e., the watermark, visible in any reproduction created from said recording. Since digital images collected by an image-capture device may be edited to correct the color within the different spatial regions, this editing process may be essentially defeated by random location selection of the spatial regions or by varying the spatial regions temporally. Alternatively, or in combination, image areas having a high degree of spatial detail may be selected for alternate color primary rendering; thus, making it difficult to edit the digital content of reproductions created from said device recordings. The selection of image portions with high spatial detail may also make it difficult to see any near threshold changes in color that may be present in the final rendered image.

In a motion image sequence, the linear combinations of the color primaries may also vary between different image frames. Temporally changing the rendering of one or more image portions makes editing images collected by an image-capture device extremely difficult. A portion may be altered within an image sequence on a frame-by-frame basis, or rendering values may also be randomly or semi-randomly selected to make this difference less predictable. Alternatively, different spatial portions within the motion image sequence may be selected as a function of time. Using this method, an observer directly viewing the original display image should once again see no visual degradation, while an observer viewing a reproduction of a capture of the image or image sequence should see significant changes in the color of some regions within the image over time.

Alternatively, particular critical colors, such as those corresponding to human skin tones, may be selected and a linear combination of color primaries may be applied to these critical colors different from the linear combination of color primaries applied to other colors within an image frame. This may be accomplished by clustering the image pixel colors within a scene, expressed in terms of a uniform color space, such as CIELAB, and applying a color-primary rendering to the image pixels in a particular color cluster different from the color-primary rendering applied to the remaining pixels in the scene. This rendering also may be changed on a scene by scene basis. Because an observer viewing a projected or self-luminous reproduction of a recording of a displayed image created by applying the teachings of the present invention should, to a large degree, visually adapt to the average color of the majority of the image, the image areas corresponding to the selected color clusters appear as either incorrect (e.g., greenish skin tones) or changing from frame to frame. This effect will degrade the visual quality of any reproduction created from captures of images created by the display device of the present invention using an image-capture device.

Figure 2:
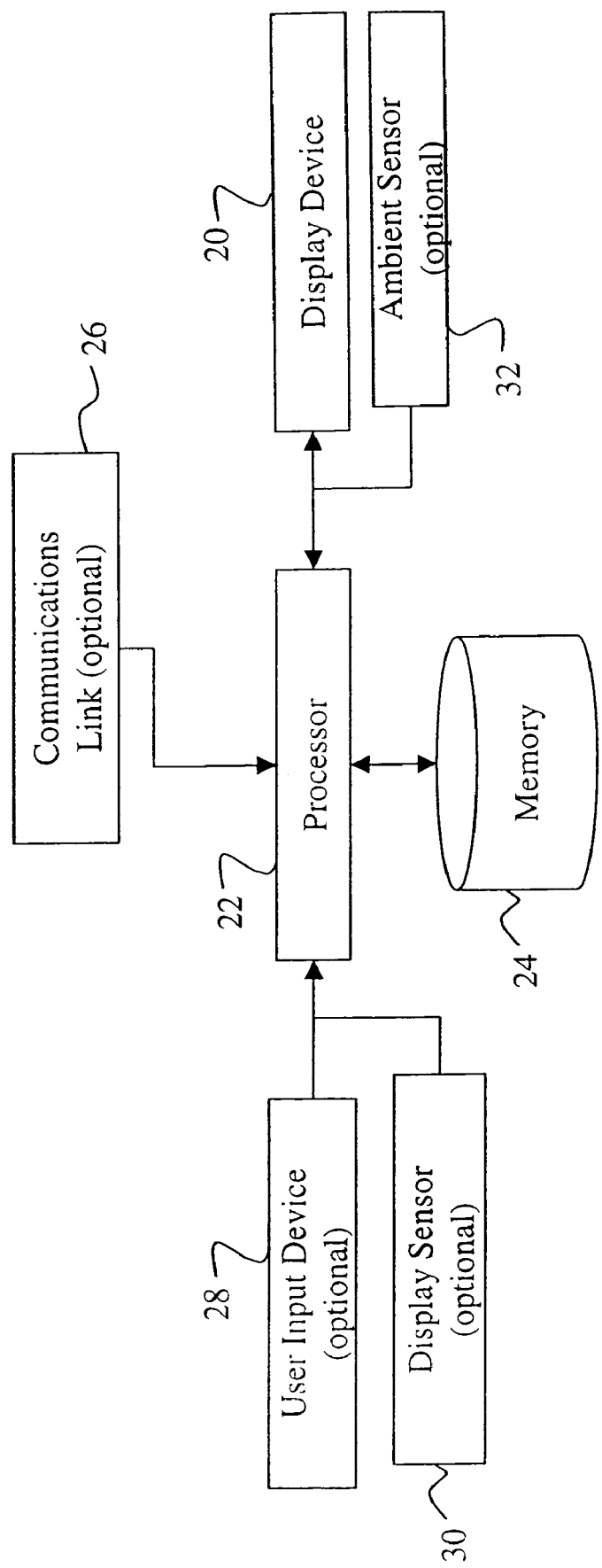
FIG. 2 is a schematic diagram showing the system components of one embodiment that are useful to practice the present invention.

Referring to FIG. 2, a system employing the present invention will typically be composed of a display device 20, a processor 22, and a memory device 24. Alternatively, the display system may include a communications link 26, a user input device 28, a display sensor 30 for sensing the luminance and/or color output of one or more light-emitting elements of the display device or a signal that is correlated with the luminance output of one or more light emitting elements and/or an ambient sensor 32 for measuring the luminance and/or color of the ambient lighting environment.

The display device 20 may be any projection or direct-view electronic display device capable of providing four or more color primaries that emit light within the visible spectrum wherein the spectral composition of each of the at least four color primaries are unique from one another and are not a linear combination of one or more of the others. Display devices of this type have been described previously in the literature and include digital projectors with increased color gamut, such as those described by U.S. Pat. No. 6,648,475 (Roddy et al.) and WO 01/95544 (Ben-Chorin et al.), as well as digital projectors with increased brightness, such as described by U.S. Pat. No. 5,233,385 (Sampsell). Similarly appropriate display devices may also be direct-view display devices with increased color gamut as described by U.S. Pat. No. 6,570,584 (Cok et al.), U.S. patent application Ser. No. 2002/0191130 (Liang et al.) and U.S. patent application Ser. No. 2004/0051724 (Brown Elliott et al.) or they may be display devices with higher luminance efficiency such as described in U.S. patent application Ser. No. 2005/0212728 (Miller et al.). It is important to note that projection displays may present color primaries temporally sequentially or simultaneously, and either spatially patterned or fully-sampled. Direct-view displays typically present color temporally simultaneously and spatially patterned. As will be discussed more fully later, the color manipulations performed as part of this invention may result in spatial artifacts that may need to be considered if one is to employ this invention on a display with spatially patterned light-emitting elements.

The processor 22 may be any general purpose or specialized processor capable of performing the calculations necessary for performing the steps of this invention. The memory device 24 may include a programmable and/or fixed memory capable of storing any video information to be displayed, information relevant to the calibration of the display device, a specification for the color distortions to be introduced, the name and/or address of the owner of the display system, and other such information.

The optional communications link 26 may be used to communicate data to be displayed, specifications for the color distortions and/or other information such as copyright information to be rendered when performing the color rendering. The optional user input device 28 may be used by the user to input additional information that is to be encoded into the image. The user input device 28 may also be used to alter the magnitude of the difference between spatial regions in the event that the information that is rendered to produce the distortions become visible during viewing, for example due to a calibration error.

The optional display sensor 30 is a sensor that is used to sense the output of one or more of the color primaries or their combinations. The display sensor 30 will ideally perform radiometric or calorimetric measurements of the light output of the display device. The display sensor 30 may alternatively measure a value correlated with the light output of the display device such as the current or voltage drawn by the light-emitting element within the display device in order to estimate a luminance output of the display device using a stored look-up table or other mathematical relationship.

The optional ambient sensor 32 may be used to measure the ambient light that is incident on or reflected by the display screen. Ideally this device will measure the spectral radiance of the ambient light. However, in a controlled lighting environment, such as a motion-picture theatre, simpler devices such as a device that measures the intensity of the ambient illuminant as well as estimating the type of light source can provide adequate information if any ambient light sensor is necessary. Further, in viewing environments with fixed lighting, a sensor to measure ambient light will generally not be necessary. Further, under many circumstances, ambient light will tend to reduce the contrast of the image produced by the display device which will tend to obscure any visible differences and therefore, such a sensor is not always required.

Figure 3:
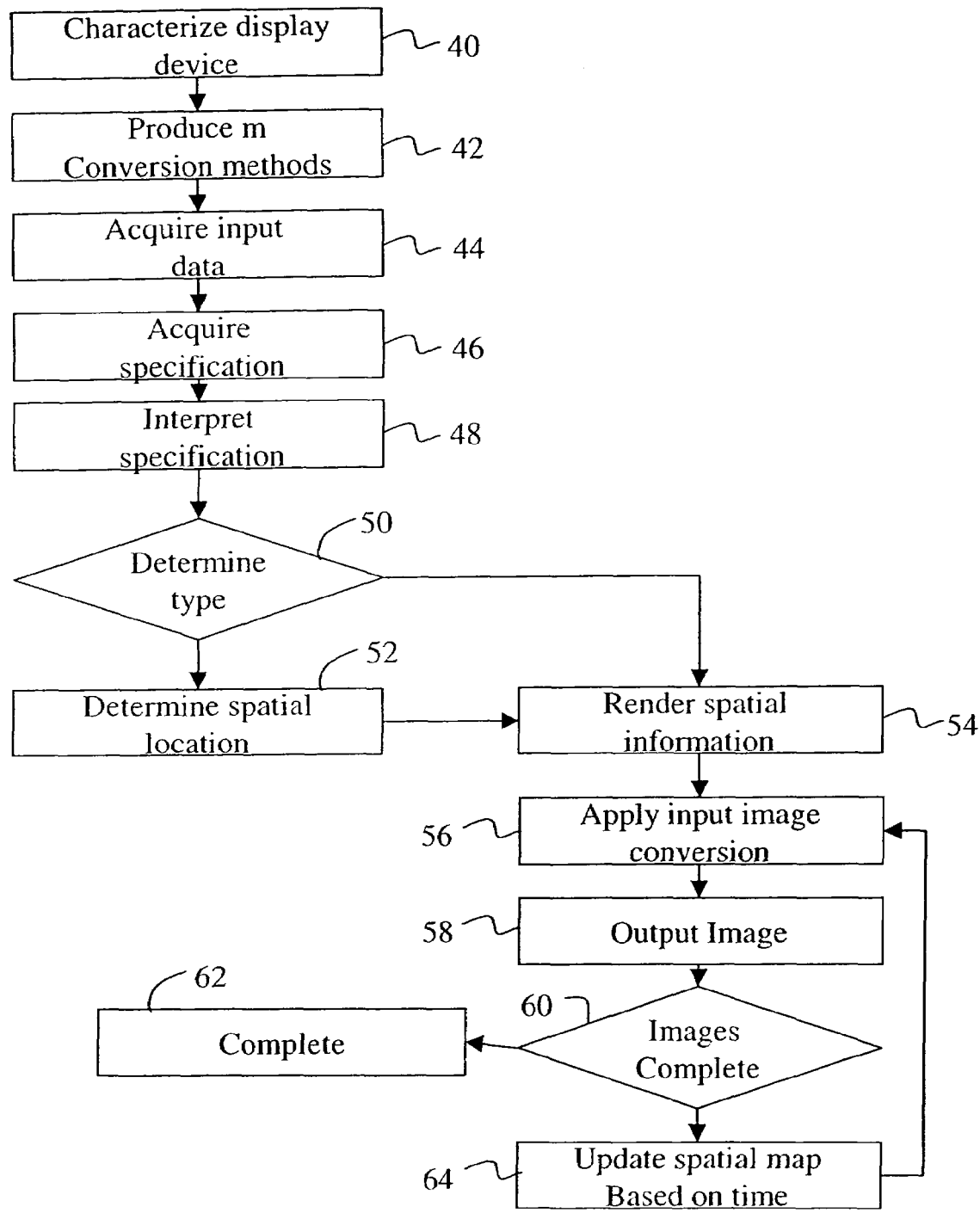
FIG. 3 is a flow chart illustrating an exemplary process for rendering information to a display device to practice the present invention.

A preferred embodiment of this invention is shown in FIG. 3. As shown in this figure, the display device 20 is characterized in step 40. This characterization will provide a method of predicting the color and luminance of the light produced by the display device for each input code value and input code-value combination that the display is capable of producing in the range of illumination environments that are likely to be applied. Although such a model can involve characterizing the display's performance under a wide range of conditions, simpler models may also be applied. One relatively complex characterization model is a pair of N-D look-up tables where N represents the number of color primary channels, and D represents dimensions. The first, and most important of these N-D lookup tables represents the color and luminance output of the display device for all possible combinations of input code values. The second of the N-D lookup tables represents the reflectance and spectral reflectivity of the image display surface for all possible combinations of input code values. Simpler models may also be utilized. One simplification is to assume that the display device will be used in darkened room conditions or that the reflectance of the image display surface will be inconsequential, making one of the N-D lookup tables unnecessary. Alternately, one might assume that reflectivity is independent of code value and therefore, the N-D lookup table may be replaced by a simple one-dimensional look up table. A second simplification is to assume that the chromaticity and the luminance of the light produced by the display device are independent of one another. In this case, it is only necessary to determine a function relating code value to luminance for each of the color channels as well as to characterize the chromaticity coordinates of the color primaries employed in the display device. One skilled in the art will recognize the known variants of additive color system models that can be applied, depending on the system characteristics and the level of accuracy required.

Using this data as input and assuming that the image signal that will be input to the display system has three color channels, a set of conversion methods are produced in step 42 in order to map each of the incoming values to one of m possible sets of code values where one set of code value combinations will be applied to the majority of the scene data and the remainder will provide the output code value combinations to be applied to the selected regions that are to be rendered with different primary combinations. Many methods for determining candidate combinations of four or more output signals to represent the input three-channel color input signal may be developed. Assuming that the color and luminance of the display device are independent of one another, methods for determining possible mappings from a three-channel color input signal to an at least four-channel color output signal have been previously disclosed in co-pending commonly assigned U.S. Ser. No. 10/607,374 (filed Jun. 26, 2003) and U.S. Ser. No. 10/812,787 (filed Mar. 29, 2004) which are incorporated herein by reference.

Figure 4:
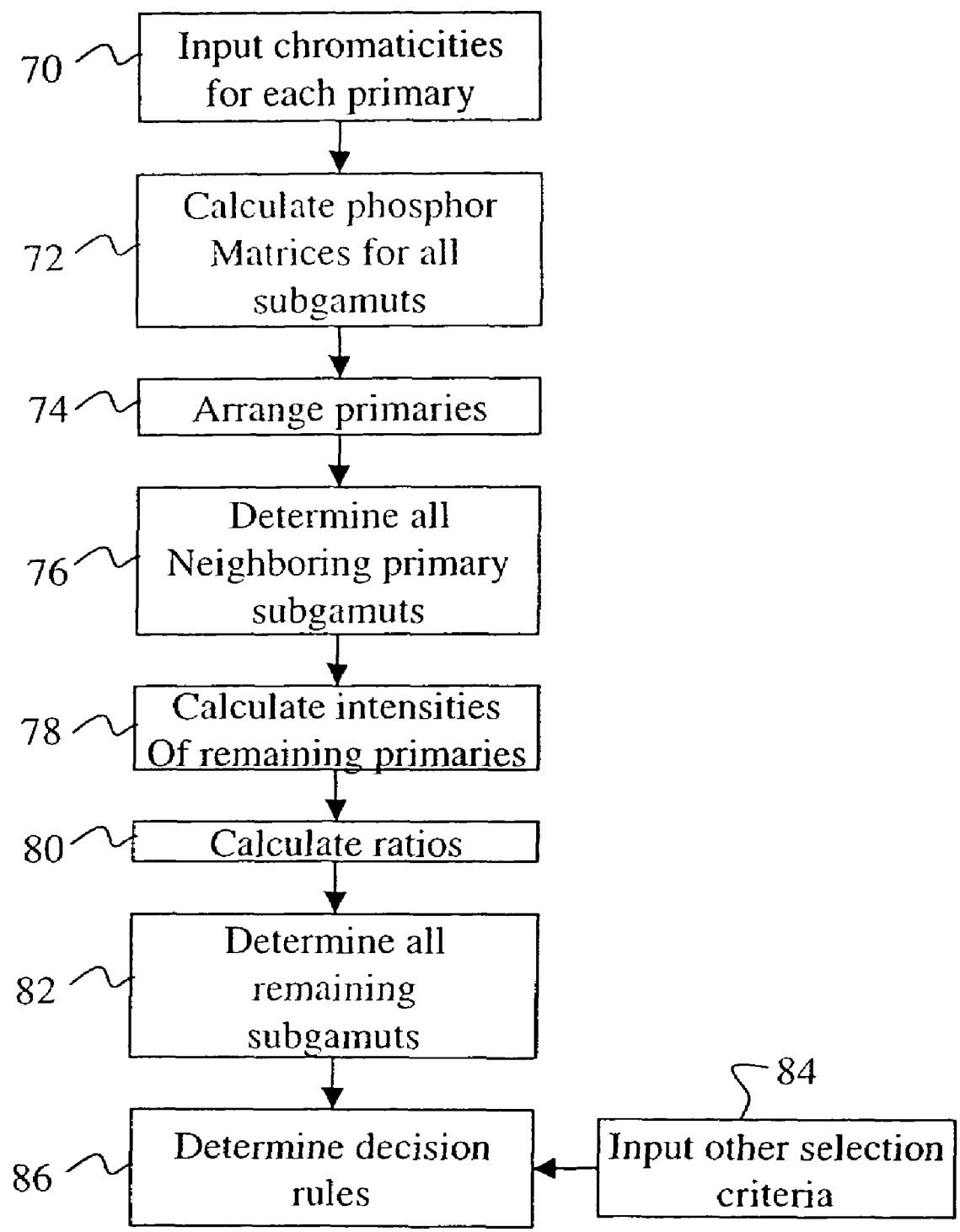
FIG. 4 a flow chart illustrating an exemplary process for forming a set of conversion methods useful in converting an input image to an image useful in the present invention.

A method suited for this transformation is also provided in FIG. 4. Using these approaches allows the proportion of the luminance intensity of the gamut defining primaries (2, 4, and 6) to alternative color subgamuts to be selected through what is known as a "mixing ratio". Within the preferred embodiment, the majority of the scene will be rendered using a mixing ratio in the neighborhood of 0.5 to provide maximum image quality. Alternative renderings may be formed using an alternative set of subgamuts and any mixing ratio value between 0 and 1.0 other than 0.5.

Figure 5:
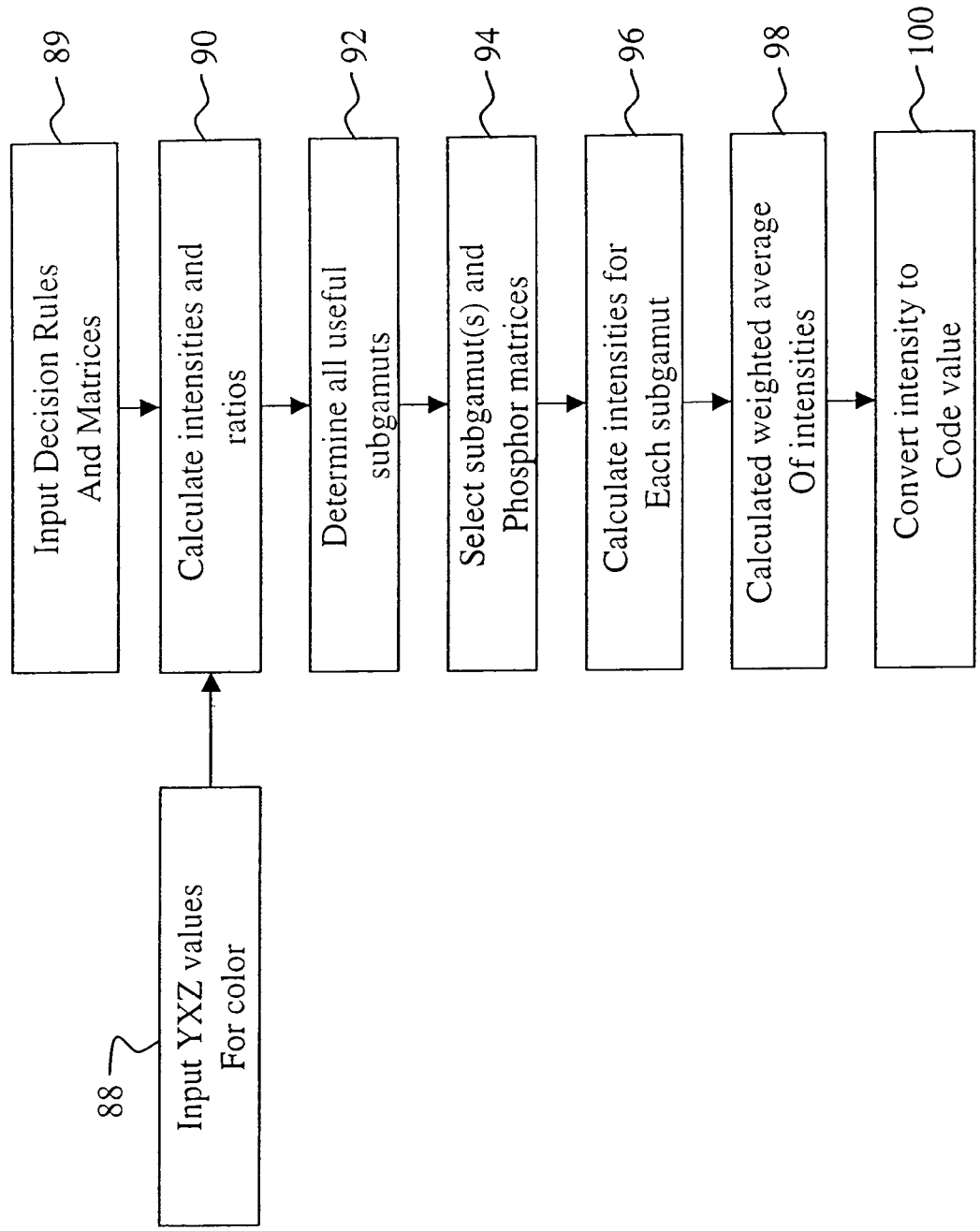
FIG. 5 is a flow chart illustrating an exemplary process for applying the input-image conversion.

One alternative approach to producing in step 42 the conversion method is to characterize the aim luminance and chromaticity values for each input code value combination; apply a model of the ambient illumination to calculate the luminance and chromaticity coordinates of the light reflected from the display for all possible code value combinations; add the reflected luminance value to the output luminance for all code-value combinations to determine the system luminance in the ambient environment; and determine the chromaticity coordinates of each primary in the ambient environment by computing the weighted average of the chromaticity coordinates of the emitted and reflected display luminance where the weighting factors are proportional to the total luminance attributable to display output and reflected luminance. The resulting relationship between code values and the luminance and chromaticity values computed here provide the information necessary to transform the input three-color signal to intensities and chromaticity coordinates necessary for application in this method. Characterization of the aim luminance and chromaticity values can be performed in real-time to account for less than optimal display performance caused by the display system's drift or decay. Having this final N-D lookup table, this table as well as the aim luminance and chromaticity values are transformed to a perceptually uniform color space such as CIELAB and the m possible solutions for each value in the input N-D lookup table with the minimum difference from the aim value are selected. The corresponding code values for the resulting m possible solutions are then used to populate the m N-D lookup tables. While this process can be relatively time consuming, it needs only to be computed once for as long as the luminance output of the display and the ambient illumination are constant. In simpler implementations such as those described in the co-pending applications and the one shown in FIG. 4, it is also possible to embed this step as a set of real-time calculations that are performed for each input code value combination in place of the look-up function. Using this method, a set of 3×3 matrices is formed together with a set of decision rules for selecting a set of one or more 3×3 matrices and these serve as the conversion method in step 42, the application of which is shown in FIG. 5.

The input image data to be rendered is then acquired in step 44. Next the specification for the embedded watermark is acquired in step 46. This specification will provide a description of the spatial, temporal, and or color characteristics of the watermark. The system then interprets in step 48 this specification and determines in step 50 the type(s) of visibly undetectable color distortions to embed. If the specification provides a list of colors that are to be rendered differently than the remainder of the image is rendered, the colors in the input image that are within specified bounds of these colors are then selected and their spatial position is determined in step 52. If there is any spatial description provided directly from the specification or converted from color information, the system renders in step 54 any spatial description into a binary or integer image. This binary or integer image represents which of the m N-D look up tables are to be indexed for each spatial location in the image. Alternatively, the spatial description image produced in 54 need not be restricted to integer values, implying fractional linear combinations of any of the m N-D look up table solutions. Such a non-integer image may or may not be encoded in a quantized, integer-based format. It should be noted that if no color or spatial information is provided, then a uniform image is generated with all pixels in the image having the same index to one of the m conversion methods. This spatial information is then applied in step 56 to the input image data by applying the correct combination of 3×3 matrices as indicated by the binary or integer image and the location of the color in color space. This step will be further explained when discussing FIG. 6. The image is then output in step 58 to the display device 20 if the image is rendered in real time or output to the memory 24 if the image is being preprocessed for display at a later time. A test is performed in step 60 to determine if all image rendering is complete. If it is complete, the process is complete in step 62. If not, any specified time sequence is used to update in step 64 the spatial map by replacing any values in the spatial map according to the time sequence. Once the spatial image is updated, it is applied in step 56 to the image data for the next frame of video and the steps 56, 58, 60 and 64 are repeated until all of the image data has been rendered. By performing the steps 40 through 64, the rendering process is completed and the images are rendered with the embedded invisible color distortions that await detection by an image-recording device.

As mentioned earlier, a method suited for transforming an incoming three-channel color signal to a four or more channel color signal (e.g., generating the conversion method) is provided in FIG. 4 and described here. The CIE chromaticity coordinates are input in step 70 for each color primary. Phosphor matrices, describing the CIE tristimulus values for color stimuli produced by the additive combination of three color primaries, are then calculated in step 72 for all subgamuts to be used in the color conversion using methods well known to those skilled in the art. The primaries are then sequentially arranged in step 74 from the primary with the most short wavelength energy to the primary with the most long wavelength energy. This may be done using the chromaticity coordinates such that the primaries are arranged to follow the border of the chromaticity diagram's spectrum locus from blue to red and back to blue again. All of the subgamuts that may be formed from neighboring sets of three primaries are then determined in step 76. Each of these subgamuts will then be defined by three primaries with a center primary from the arranged in step 74 list and two neighboring primaries at the extremes or ends of the triangle used to form the subgamut. As an example, we will assume a display device having the four primaries shown in FIG. 1. For such a device the primaries would be arranged in a list progressing in the order blue 6, cyan 10, green 4 and red 8. In such a device a first subgamut triangle may be formed from blue 6, cyan 10 and green 4 primaries and would have the cyan primary 10 as the center primary and the blue 6 and green 4 primaries as the neighboring end primaries. A second subgamut would be defined with the green primary 4 as the center primary and the cyan 10 and red 2 primaries as the neighboring end primaries. The final subgamut that can be created from neighboring primaries would be formed with the red primary 2 as the center primary and the green 4 and blue 6 primaries as the neighboring end primaries.

For each of the subgamuts determined in step 76, the theoretical intensities for forming each primary that is not in each subgamut are calculated in step 78 (e.g., for the subgamut formed from the blue 6, cyan 10 and green 4 primaries the theoretical intensities are calculated for forming the red primary). These calculated intensities have values less than zero, as it is not physically possible to form these colors using these subgamuts. However, this calculation is useful as the ratios of the intensities for the outside primaries in the gamut define a line that segments subgamuts within the color space. The ratio of the theoretical intensities of the two primaries that are at the ends of the current subgamut used to form each primary outside the current subgamut is then calculated in step 80. All other subgamuts are then determined in step 82 by forming subgamuts where first one and if possible more primaries in the ordered list are omitted as one progresses through the list, keeping in mind that to form a subgamut requires three primaries. As it will be possible to form each color using multiple subgamuts, other input selection criteria may be input in step 84 which can be used to define the decision rules around the default rendering values and the m alternative sets of rendering values. Finally, a set of decision rules is determined in step 86. The decision rules are formed knowing that any color having all-positive color-primary intensities when formed from one of the subgamuts determined in step 76 lies within that subgamut. Any color having one or more negative primary values lies outside the subgamut. However, any color having a ratio that is larger than the ratio determined in step 80 will lie to the same side of a line as the end primary that is used in the numerator of the ratio calculation where the line intercepts the center primary and the corresponding primary from outside of the subgamut. These decision rules will also consider other information such as a preferred set of primaries for the current of the m renderings. Other information such as power consumption or lifetime of the primaries, or predictions of overall image quality to help provide a selection of a default combination of subgamuts, as well as one or more alternative combinations of subgamuts to be employed in rendering may also be considered.

Based upon this information, a set of logic may be formed that indicates all possible home subgamuts for any input color which may be defined from a set of n primaries by calculating n−2 sets of intensity values and n/2 comparisons as opposed to calculating the intensities for all n!/(3!*(n−3)! combinations of the n primaries. Steps 70 through steps 82 are dependent upon the chromaticity coordinates of the primaries and for this reason, need only be performed once. These steps may be performed at device startup but may also be performed once during manufacturing or initial startup of the display device and the resulting decision rules stored in memory, allowing each of the following steps to be performed without further delay.

FIG. 5 shows a method for applying in step 56 the input image conversion using the method of the preferred embodiment. To apply this method, the CIE XYZ tristimulus values corresponding to each incoming code value are input in step 88. Next the decision rules and 3×3 matrices determined using the method shown in FIG. 4 are input in step 89. The color-primary intensities and ratios for each set of XYZ values are then calculated in step 90 for each of the non-overlapping and neighboring subgamuts determined in step 76 of FIG. 4. Based upon the decision rules formed in step 86 of FIG. 4, all subgamuts useful in creating the desired color are determined in step 92. The appropriate subgamut or subgamuts are then selected in step 94 based on the rendering information for the current of the m renderings and the decision rules determined in step 86.

Using this method for the color conversion, the current of the mth renderings are then determined by calculating in step 96 the intensities for each subgamut. A weighted average of the intensities are then calculated in step 98. Generally, the weightings in this average will be the mixing ratio for each subgamut. This weighted average produces the relative luminance intensity for each primary. These relative luminance intensities are then converted in step 100 to code values using the characterization data obtained in step 40 of FIG. 3 and these code values compose the output image discussed in FIG. 3. It should be noted that not only does this method for piracy protection provide this feature but it also can have the benefit of increasing the color gamut volume of images produced by the display device. The color gamut volume refers to a three-dimensional volume of achievable luminance and chrominance values for color stimuli produced by the display device. Whenever an additional primary is outside the color gamut triangle shown in FIG. 1, this fact is relatively obvious. What may not be quite so obvious from the earlier discussion is that for additional color primaries whose chromaticities are on or inside the color gamut boundary 8, colors within the color gamut of the display device can be formed using more than one set of three of the primaries and still provide an opportunity for color mixing as was described for the additional color primaries outside the color gamut boundary 8. Even under these conditions, the color gamut volume can be increased, because colors near this primary may be produced with higher luminance than could be produced without this additional primary.

It was noted earlier that if the image-forming mechanism of the display device is comprised of a pattern of spatially separate light emitting elements of different colors, it is necessary to impose additional constraints to enable the method of this invention. In fact, such a display serves to place an additional constraint on the selection of candidate mixing ratios. This constraint arises from the fact that when a significant amount of the energy is shifted from one light emitting element to a neighboring light emitting element, a distinct spatial pattern may become visible in the display image that would make any spatial pattern visible even if the integrated color output from each of the light-emitting elements in a pixel for two different solutions provided exactly the same chromaticity and luminance values. One way to avoid such a pattern is to employ only temporal variations, avoiding rendering a spatial information pattern as an invisible color distortion. Another method is to constrain the amount of luminance that can be moved from one light-emitting element to another such that a change in the spatial appearance of the pixel is not visible. To add this constraint, the pixel pattern may be analyzed when each candidate color rendering is applied using a visual difference model such as the one described by Zhang and Wandell in the 1997 SID Journal entitled "A spatial extension of CIELAB for digital color image reproduction" to determine if the spatial pattern produced with each rendering method is visually distinct. If the two pixel patterns are visually distinct from one another, this candidate color rendering is discarded. Otherwise, the candidate color rendering should provide an invisible color distortion.

Since it may not be intuitive that a pair of displayed colors that appear indistinguishable when viewed by the unaided human eye can be formed from two different combinations of four or more primaries and yet reproduce inconsistently or non-uniformly when recorded using a typical image-capture device and viewed on another or the same display device, an example is provided here. In order to provide this example, it is necessary to recognize that the CIE 1931 color-matching functions were derived from color-matching experiments in which human observers were asked to select visually matched color stimuli that had different spectral compositions. Therefore it is assumed and has been shown that color stimuli of differing spectral compositions but having equivalent XYZ tristimulus values computed using the CIE 1931 color-matching functions will produce the same perceived color when viewed under equivalent viewing conditions. XYZ tristimulus values may be converted to chromaticity coordinates via known methods. Therefore, colors whose chromaticity coordinates and luminance values match will be perceptually indistinguishable to a viewer with normal color vision when viewed under equivalent conditions. However, this visual match may not be achieved under all viewing conditions, particularly in dim viewing conditions where the retinal rods may play a role in color perception, requiring a different color space to have this same property in the strictest sense. Additionally, normal variation among viewers may result in varying degrees of color difference to each individual. Despite this possibility, the 1931 CIE chromaticity space provides an adequate description across a broad range of viewing conditions. It should be clear to one skilled in the art that this same invention can be applied while employing a different color-matching function set or color specification paradigm, perhaps more appropriate for a given viewing environment or viewer population.

Figure 6:
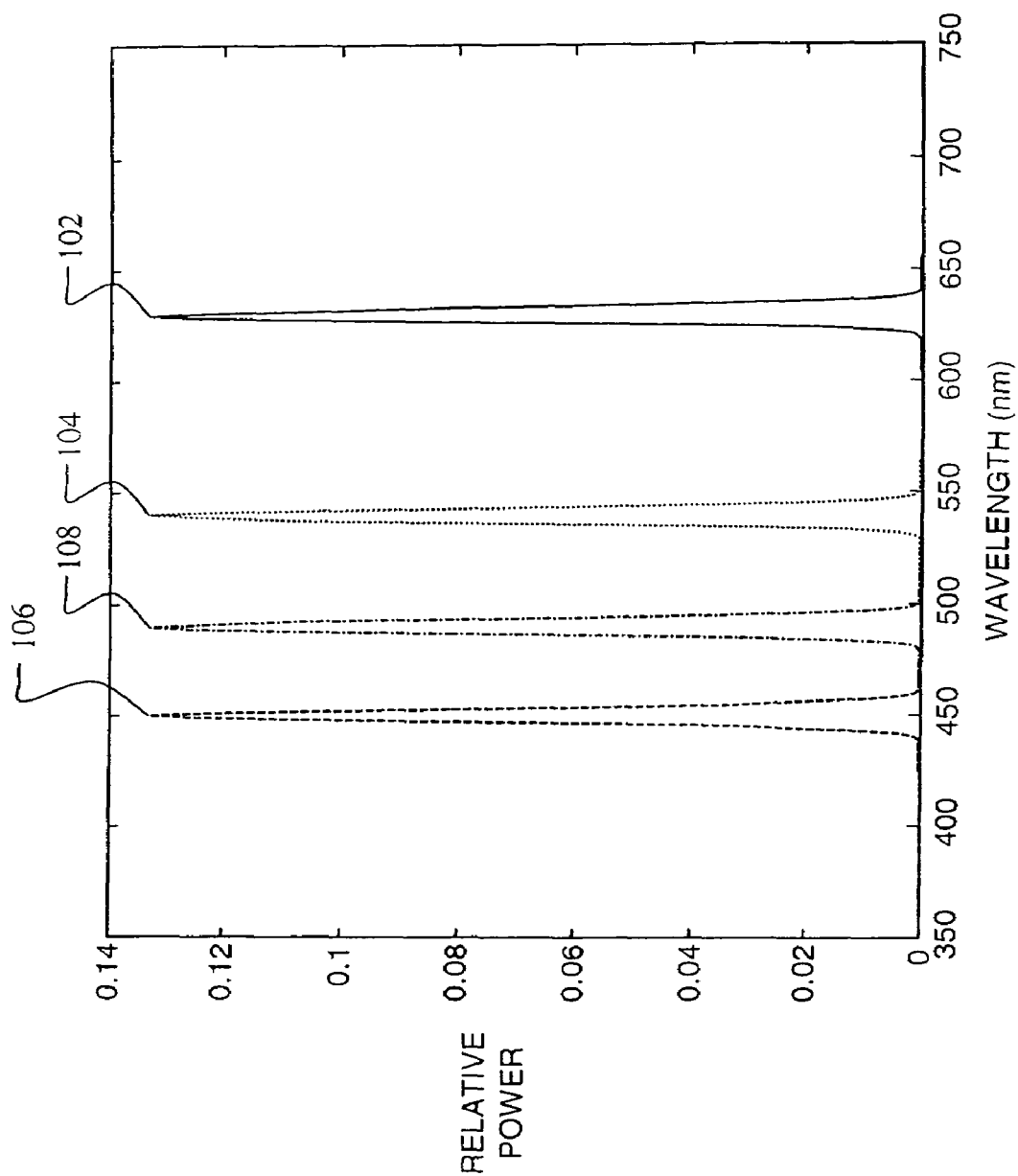
FIG. 6 is a graph showing the spectral location and emission of a set of display primaries useful in practicing the present invention.

Having a color space in which it can be determined if color stimuli with different spectral compositions are perceptually equivalent, it is then necessary to demonstrate that there are at least two possible solutions for combining the output of four or more color primaries to produce stimuli having equivalent chromaticity coordinates and luminance and that these at least two solutions would be recorded differently by a digital image-capture device with representative spectral sensitivities. To perform this analysis we will assume a display with primaries having narrow-band emission, as may be characteristic of LED sources. FIG. 6 shows the spectral power distribution for four color primaries having narrow-band emission that may be characteristic of red 102, green 104, blue 106, and cyan 108 color primaries. These spectral power distributions can be integrated appropriately using calorimetric computations known to those skilled in the art to determine the 1931 CIE x,y chromaticity coordinates for each of these primaries. These data are shown in Table 1.

TABLE 1

| Primary | x | y |
|---|---|---|
| red | 0.7073 | 0.2927 |
| green | 0.2305 | 0.7531 |
| blue | 0.0469 | 0.2936 |
| cyan | 0.1564 | 0.0179 |

Figure 7:
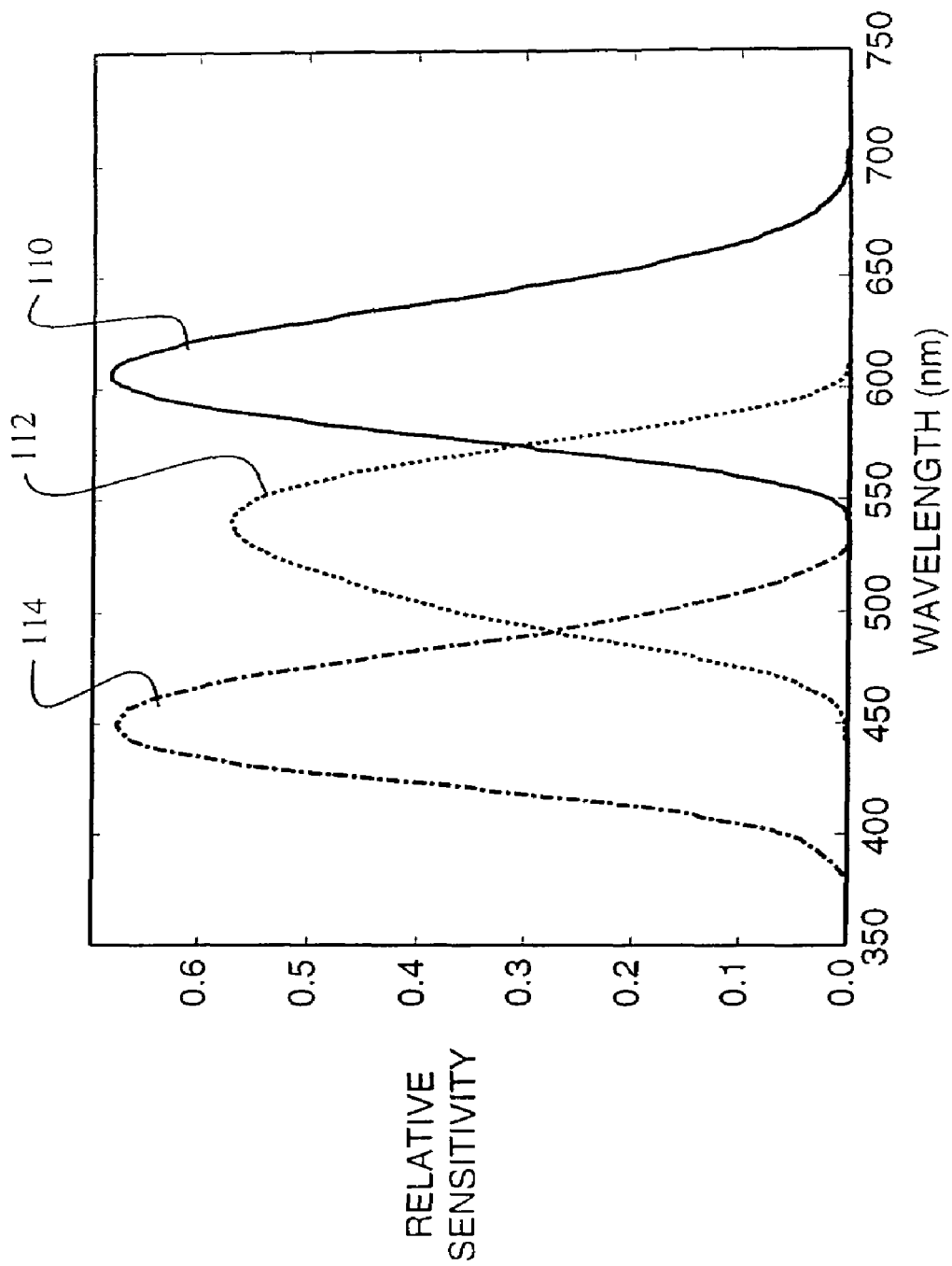
FIG. 7 is a graph showing the spectral response for a typical image-recording device that might be used to record an image from a display device of the present invention.
Figure 8:
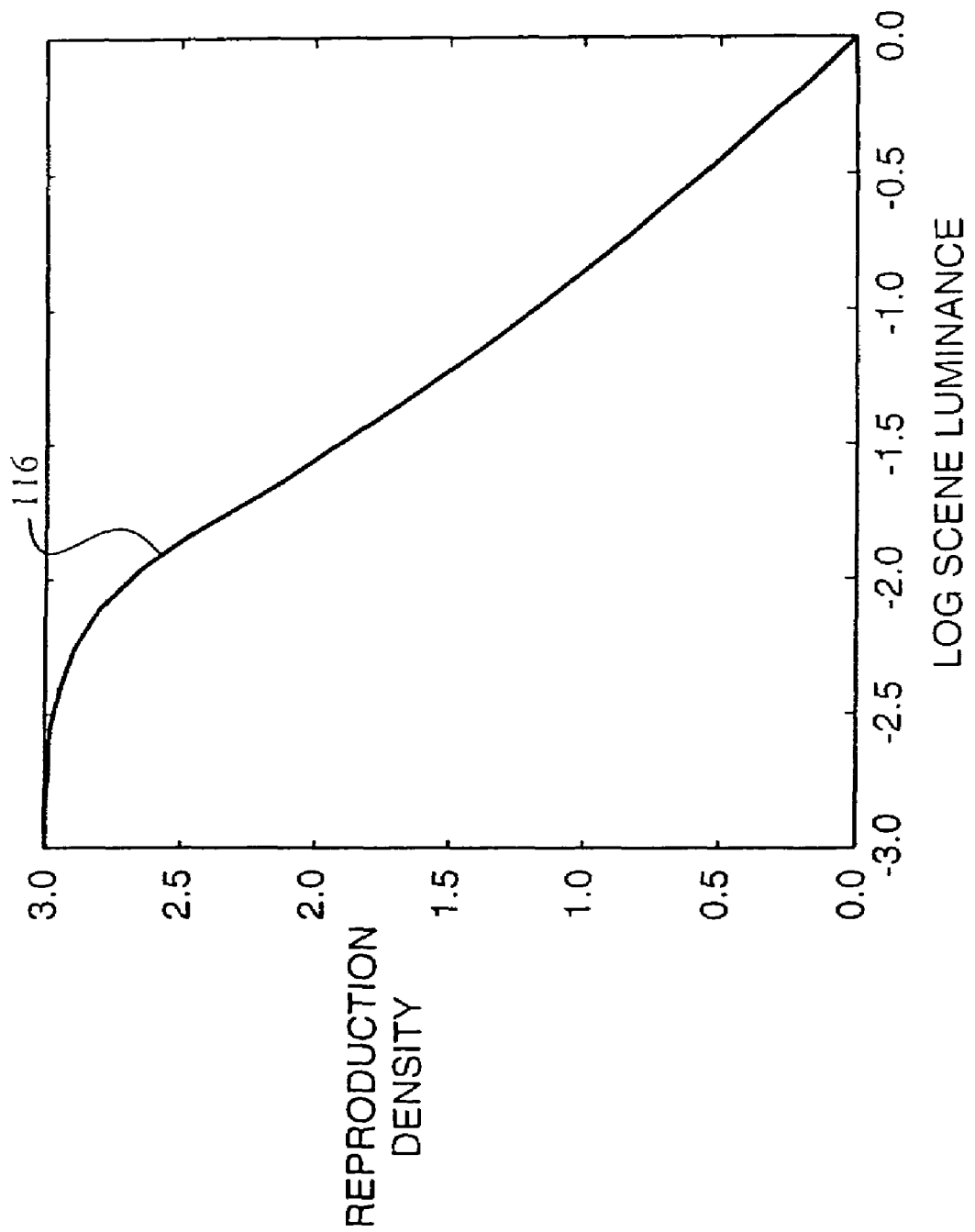
FIG. 8 is a graph showing the print-through grayscale characteristic of a typical image-recording device that might be used to record an image from a display device of the present invention.

We will further select an image-capture system. The spectral sensitivity of this capture system is shown in FIG. 7 and represents typical video camera spectral sensitivities as published by Giorgianni and Madden in *Digital Color Management: Encoding Solutions*, Addison-Wesley, 1998. As shown in this figure, the capture system is sensitive to bands of energy in the red 110, green 112 and blue 114 regions of the spectrum. The camera processes the data it receives, first performing a white balance correction by scaling the red, green, and blue image-capture signals independently such that a known or theoretical scene white produces equal signals in each color channel. Here a simple white-balance is employed that scales its responses to unity for the brightest object in the scene. Other variations are possible and likely, which would change the relative values in the present example, but have no effect on the usefulness of the present invention. The balanced signals are rendered through a grayscale 116 as shown in FIG. 8, which provides a correction for viewing flare and adds a visually pleasing contrast boost. Finally, the grayscale-rendered color signals are rotated with a 3×3 matrix to approximate CIE XYZ tristimulus values for display. Skilled readers will note that a practical camera system would include the encoding of these reproduction displayed CIE XYZ tristimulus values in a standard metric such as sRGB or YCC. For the purpose of this example, this step is omitted because it would be inverted upon subsequent display with an accurately calibrated display system. The reproduction displayed CIE XYZ tristimulus values, possibly expressed in a color representation such as CIELAB, are the quantities of interest.

To further specify this example, we select a set of colors to display with the specified four-color display system. The colors selected for this example are a subset of the colors specified for the Macbeth Color Checker Color Rendition Chart, published by Macbeth, Baltimore, Md., illuminated by CIE Standard Illuminant D65. The selected patches represent dark skin, light skin, foliage, bluish green, orange, moderate red, yellow-green, orange-yellow, green, red, yellow, white, four densities of gray and black. We select the foliage patch to provide specific illustration of the example. The foliage patch under D65 illumination has CIE XYZ tristimulus values of 11.42, 15.01, and 7.42, relative to a perfect white with 100 units of luminance value Y. Using the red, green, and blue (RGB) display primaries from Table 1, 2.613, 12.25, and 0.1549 units of luminance are required, respectively, to produce a stimulus having the same CIE XYZ tristimulus values relative to a perfect white with 100 units each of the red, green, and blue primaries. Likewise, using the red, green, and cyan (RGC) display primaries from Table 1, 3.456, 8.339, and 3.220 units of luminance are required. Because the color stimuli produced by the RGB primaries and the RGC primaries have identical CIE XYZ tristimulus values, they will appear identical in color under the same viewing conditions to an observer with normal color vision. However, when recorded and redisplayed by the specified image capture system, the results will differ. The foliage patch displayed with RGB primaries results in camera responses of 0.0772, 0.1033, 0.0405, when white balanced to unity response values to the assumed brightest stimulus, the displayed RGC white. The camera responses resulting from the same foliage color as displayed with RGC primaries are 0.1020, 0.1269, 0.0667. In order to relate these differences on a perceptual scale, it is important to look at the colors reproduced from the image-capture system signals. The CIELAB L*,a*,b* values of the reproduced RGB foliage patch are 30.42, −18.22, and 27.77, while those of the reproduced RGC foliage patch are 35.01, −14.94, and 21.15. The difference in color, or delta E*, the Euclidean distance, between these two three-dimensional points is 8.7. Since a delta E* difference of 1.0 is visible to most observers, this difference would be clearly visible. Table 2 shows the reproduced CIELAB values for all 17 of the example colors using the RGB and RGC display primaries, as well as the resultant delta E* differences between them.

TABLE 2

| Patch Description | Reproduction from capture of RGB | | | Reproduction from capture of RGC | | | Delta |
|---|---|---|---|---|---|---|---|
| | L* | a* | b* | L* | a* | b* | E* |
| Dark Skin | 24.34 | 13.08 | 18.68 | 29.49 | 11.54 | 13.55 | 7.42 |
| Light Skin | 53.05 | 16.75 | 22.67 | 61.64 | 14.84 | 15.9 | 11.1 |
| Foliage | 30.42 | −18.22 | 27.77 | 35.01 | −14.94 | 21.15 | 8.7 |
| Bluish Green | 53.54 | −35.47 | −0.52 | 67.43 | −22.7 | −2.48 | 18.97 |
| Orange | 50.03 | 32.23 | 68.39 | 51.86 | 30.9 | 59.79 | 8.9 |
| Moderate Red | 39.07 | 42.06 | 22.95 | 45.29 | 37.09 | 16.46 | 10.28 |
| Yellow Green | 57.97 | −24.47 | 64.77 | 61.21 | −22.31 | 53.85 | 11.59 |
| Orange Yellow | 58.58 | 15.09 | 71.53 | 61.07 | 14.35 | 61.17 | 10.68 |
| Green | 37.63 | −37.7 | 34.39 | 42.17 | −31.47 | 26.49 | 11.04 |
| Red | 31.07 | 46.99 | 35.59 | 34.01 | 44.1 | 28.52 | 8.18 |
| Yellow | 68.52 | 0.62 | 87.61 | 70.67 | 0.61 | 76.11 | 11.7 |
| White | 74.5 | −3.58 | 0.55 | 91.47 | −0.36 | −2.01 | 17.46 |
| Gray 1 | 64.31 | −2.78 | 0.17 | 79.74 | 0.02 | −2.07 | 15.85 |
| Gray 2 | 49.6 | −2.67 | 0.07 | 62.74 | −0.19 | −1.8 | 13.5 |
| Gray 3 | 33.93 | −2.3 | −0.57 | 44.78 | −0.21 | −1.93 | 11.14 |
| Gray 4 | 17.85 | −1.56 | −1.07 | 26.37 | 0.01 | −1.95 | 8.72 |
| Black | 3.61 | −0.39 | −0.6 | 8.3 | 0.25 | −1.64 | 4.84 |

These delta E* differences which range from 7.42 to as much as 18.97, all of which would undoubtedly be visible, and likely be objectionable, to a viewer of the captured image. This example demonstrates that visually matched color stimuli on a display system of the present invention will become visibly distinct when reproduced from a typical image-capture device, illustrating the value in the present invention in distorting unauthorized reproductions.

While the invention has been described with particular reference to its application in protection of copyrighted material and in particular to motion picture films, it will be recognized that this technology may be applied in other domains as well. In another embodiment, the display system may be embedded in a portable display device and used to display information such as the name of the owner of the display system and/or his or her address in order to deter theft or aid the return of lost items. In another embodiment, the display system may be embedded in a child's toy to enable the hidden display of information that can be revealed using a camera or other specialized viewing device. Such a viewing device may consist of low-cost items such as color filters to improve the visibility one or more of the four or more light emitting elements.

The invention has been described in detail with particular reference to certain preferred embodiments thereof, but it will be understood that variations and modifications can be effected within the spirit and scope of the invention.

PARTS LIST 2 red primary chromaticity coordinates
4 green primary chromaticity coordinates
6 blue primary chromaticity coordinates
8 color gamut boundary
10 cyan primary chromaticity coordinates
20 display device
22 processor
24 memory device
26 communications link
28 user input device
30 display sensor
32 ambient sensor
34 ambient lighting environment
40 characterize display device step
42 produce conversion methods step
44 acquire input image data step
46 acquire specification step
48 interpret step
50 determine type(s) step
52 determine spatial position step
54 render spatial description step
56 apply spatial information step
58 output image step
60 test complete step
62 complete step
64 update spatial map step
70 input chromaticity coordinates step
72 calculate phosphor matrix step
74 arrange primaries step
76 determine subgamuts step
78 calculate theoretical intensities step
80 calculate ratio step
82 determine subgamuts step
84 input selection criteria step
86 determine decision rules step
88 input XYZ values step
89 input decision rules and matrices step
90 calculate intensities and ratios step
92 determine subgamuts step
94 select subgamuts and phosphor matrices step
96 calculate intensities step
98 calculate weighted average of intensities step
100 convert intensities to code value step
102 spectral power distribution for red primary
104 spectral power distribution for green primary
106 spectral power distribution for blue primary
108 spectral power distribution for cyan primary
110 camera red sensitivity
112 camera green sensitivity
114 camera blue sensitivity
116 camera grayscale

What is claimed is:

1. A color display system, comprising:
    (a) a display device having four or more visible color primaries capable of producing metamerically matched color stimuli; and
    (b) a processor for controlling the four or more color primaries to selectively render portions of an image or image sequence such that visually equivalent colors displayed in two or more image portions differ in their spectral composition;
    wherein an input image color displayed in a first portion is rendered using one combination of the four or more color primaries and a given input image color displayed in a second portion is rendered using a second combination of the four or more visible color primaries.

2. The color display system claimed in claim 1, wherein the four or more color primaries are arranged in a spatial pattern and wherein the different portions of the image or image sequence are rendered such that there is no perceived difference in the spatial pattern of the input image color when displayed in the two or more portions.

3. The color display system claimed in claim 1, wherein the portions contain watermark information and/or color degradation when captured with an image-capture device and subsequently redisplayed.

4. The color display system claimed in claim 1, wherein the processor converts three or more channel color-image signals to four or more channel color-image signals for use by the display device.

5. The color display system claimed in claim 1, wherein an input image is rendered for display using the four or more color primaries in real time.

6. The color display system claimed in claim 1, wherein an input image is pre-rendered for display using the four or more color primaries for subsequent display.

7. The color display system claimed in claim 3, wherein the processor receives a three or more color input image signal, and an instruction for spatial, temporal and/or color patterning for different portions of an image when embedding the watermark information and/or causing a significant color degradation when captured with an image capture device and subsequently redisplayed.

8. The color display system claimed in claim 7, wherein at least one of the image portions has a shape of a text character.

9. The color display system claimed in claim 8, wherein one or more regions provides textual information, wherein the textual information is selected from the group consisting of:
(a) a name of the copyright owner;
(b) a date of the copyright;
(c) an owner of the color display system;
(d) an address of the owner of the color display system;
(e) a location of the color display system; and
(f) a reminder of copyright penalties.

10. The color display system claimed in claim 7, wherein the instruction of the spatial and/or temporal pattern includes a random variable to decrease predictability of the embedded watermark information and/or the significant color degradation when captured with the image capture device and is subsequently redisplayed.

11. The color display system claimed in claim 7, wherein the instruction of the color pattern includes, colors that are particularly salient in human memory.

12. The color display system claimed in claim 11, wherein the instruction of the color pattern includes colors often associated with skin, sky, and/or foliage.

13. The color display system as claimed in claim 1, wherein the color display system is distributed with a dedicated viewing apparatus.

14. The color display system as claimed in claim 13, wherein the dedicated viewing apparatus contains a color filter.

15. The color display system as claimed in claim 1, wherein a color primary is rendered to image pixels in a particular color cluster different from color primary rendering applied to remaining pixels in a scene.

16. The color display system claimed in claim 1, wherein the display device is a projection display device.

17. The color display system claimed in claim 1, wherein the display device is a direct view display.

18. The color display system as claimed in claim 1, further comprising:
c) a display sensor for measuring a value that correlates with light output of one or more of the four or more visible color primaries.

19. The color display system as claimed in claim 18, wherein the display sensor measures characteristics of the display device selected from the group consisting of tristimulus values, chromaticity coordinates, luminance, radiance, and reflectance.

20. The color display system as claimed in claim 18, wherein the display sensor measures current and/or voltage of a light source within the display device.

21. The color display system as claimed in claim 20, wherein a measurement of current and/or voltage is used to compute and/or derive an output luminance value.

22. The color display system as claimed in claim 18, wherein the processor uses the value measured by the display sensor to dynamically alter the spectral composition of one or more of the portions of the image or image sequence.

23. The color display system as claimed in claim 18, wherein the processor provides real time characterization of the four or more visible color primaries.

24. The color display system as claimed in claim 1, wherein three of the four or more visible color primaries emit red, green, and blue light.

25. The color display system as claimed in claim 1, wherein light emitted by at least one of the four or more visible color primaries is either white, cyan, yellow, or magenta.

26. The color display system as claimed in claim 1 further comprising:
(a) a first visible color primary having a first chromaticity coordinate;
(b) a second visible color primary having a second chromaticity coordinate; and
(c) wherein the first and second chromaticity coordinates are substantially the same and spectra corresponding to the first and second visible color primaries are substantially different.

27. A method for using visible light to deter unwanted copying of image content, comprising the steps of;
(a) combining four or more visible color primaries to render different portions of an image or image sequence such that a given input image color displayed in two or more portions has a different spectral composition and is perceived as visually equivalent;
(b) displaying the image portions as part of the image content;
(c) receiving three or more color input image signals, and an instruction for spatial, temporal and/or color patterning for the two or more portions of an image; and
(d) partitioning the three or more color input image signal into different portions according to the instruction.

28. The method claimed in claim 27, wherein the two or more portions form watermark information and/or undergoes significant color degradation when captured with an image capture device and is subsequently redisplayed.

29. The method claimed in claim 27, wherein at least one of the portions has the shape of a text character.

30. The method claimed in claim 29, wherein one or more regions are shaped to provide textual information, wherein the textual information is selected from the group consisting of:
(a) a name of the copyright owner;
(b) a date of the copyright;
(c) an owner of the color display system;

(d) an address of the owner of the color display system;

(e) a location of the color display system; and (f) a reminder of copyright penalties.

31. The method claimed in claim 27, wherein the instruction of the spatial and/or the location of the temporal pattern include a random variable to decrease predictability of a position and/or rendering of at least one of the two or more portions.

32. The method claimed in claim 27, wherein the instruction of the color pattern includes colors that are particularly salient in human memory.

33. The method claimed in claim 27, wherein a timing or location of at least one of the two or more portions is determined as a function of a random variable.

* * * * *